(12) United States Patent
Lee

(10) Patent No.: US 11,624,952 B2
(45) Date of Patent: Apr. 11, 2023

(54) BACKLIGHT UNIT AND DISPLAY DEVICE INCLUDING THE SAME

(71) Applicant: Samsung Display Co., Ltd., Yongin-Si (KR)

(72) Inventor: Mi-Sun Lee, Sejong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/358,459

(22) Filed: Jun. 25, 2021

(65) Prior Publication Data

US 2022/0075230 A1 Mar. 10, 2022

(30) Foreign Application Priority Data

Sep. 4, 2020 (KR) .................. 10-2020-0113246

(51) Int. Cl.
*G02F 1/1335* (2006.01)
*G02F 1/13357* (2006.01)
*H05B 45/14* (2020.01)

(52) U.S. Cl.
CPC .. *G02F 1/133612* (2021.01); *G02F 1/133603* (2013.01); *G02F 1/133605* (2013.01); *G02F 1/133607* (2021.01); *H05B 45/14* (2020.01)

(58) Field of Classification Search
CPC ......... G02F 1/133612; G02F 1/133603; H05B 45/14

USPC ...................................................... 349/61–68
See application file for complete search history.

(56) References Cited

U.S. PATENT DOCUMENTS

| 2015/0252960 | A1* | 9/2015 | Song | F21V 5/048 |
| | | | | 315/186 |
| 2020/0073047 | A1* | 3/2020 | Jeong | G02B 6/0083 |
| 2020/0074917 | A1* | 3/2020 | Li | G09G 3/3426 |
| 2021/0132439 | A1* | 5/2021 | Hong | G02F 1/136286 |

FOREIGN PATENT DOCUMENTS

| KR | 100755615 B1 | 9/2007 |
| KR | 1020120047390 A | 5/2012 |
| KR | 1020120074921 A | 7/2012 |
| KR | 1020160090692 A | 8/2016 |
| KR | 1020180100164 A | 9/2018 |

\* cited by examiner

*Primary Examiner* — Charles S Chang
(74) *Attorney, Agent, or Firm* — Cantor Colburn LLP

(57) ABSTRACT

A backlight unit includes a substrate, a plurality of light source assemblies disposed on the substrate, each of the light source assemblies including first to k-th light sources, where the k is a natural number greater than or equal to two, a plurality of sensing lines disposed on the substrate, the sensing lines respectively connected to the first light sources of the light source assemblies, a connection line disposed on the substrate, the connection line connecting the first to k-th light sources of each of the light source assemblies in series, and a controller connected to the sensing lines, and a width of the connection line is greater than a width of each of the sensing lines.

19 Claims, 6 Drawing Sheets

BACKLIGHT UNIT AND DISPLAY DEVICE INCLUDING THE SAME

This application claims priority to Korean Patent Application No. 10-2020-0113246 filed on Sep. 4, 2020, and all the benefits accruing therefrom under 35 U.S.C. § 119, the content of which in its entirety is herein incorporated by reference.

BACKGROUND

1. Field

Embodiments relate to a display device. More particularly, embodiments relate to a backlight unit and a display device including the backlight unit.

2. Description of the Related Art

An importance of a display device, which is a connection medium between a user and information, is increasing in accordance with a development of information technology. Accordingly, a usage of the display device such as a liquid crystal display device, an organic light emitting display device, or the like is increasing.

The liquid crystal display device may include a display panel for generating an image and a backlight unit for providing light to the display panel. The display panel may display an image by adjusting transmittance of light provided from the backlight unit.

The backlight unit may be classified as an edge type backlight unit for supplying light to the display panel from an edge side of the display panel and a direct type backlight unit for supplying light to the display panel at a back or rear side of the display panel. The direct type backlight unit has advantages such as high light utilization efficiency, easy handling, no limitation in the size of the display panel, and relatively low price.

SUMMARY

Embodiments provide a backlight unit in which a relatively large number of light sources emit light of uniform brightness and a display device including the backlight unit.

A backlight unit in an embodiment includes a substrate, a plurality of light source assemblies disposed on the substrate, each of the plurality of light source assemblies including first to k-th light sources, where the k is a natural number greater than or equal to two, a plurality of sensing lines disposed on the substrate, the plurality of sensing lines respectively connected to the first light sources of the plurality of light source assemblies, a connection line disposed on the substrate, the connection line connecting the first to k-th light sources of each of the plurality of light source assemblies in series, and a controller connected to the plurality of sensing lines. A width of the connection line is greater than a width of each of the plurality of sensing lines.

In an embodiment, widths of the plurality of sensing lines may be equal to each other.

In an embodiment, widths of the plurality of sensing lines may be different from each other.

In an embodiment, the plurality of light source assemblies may include a first light source assembly disposed on a first distance from the controller and a second light source assembly disposed on a second distance greater than the first distance from the controller. The plurality of sensing lines may include a first sensing line connected to the first light source assembly and a second sensing line connected to the second light source assembly. A width of the second sensing line may be greater than a width of the first sensing line.

In an embodiment, a number of the first to k-th light sources included in each of the plurality of light source assemblies may be equal.

In an embodiment, the first to k-th light sources may be arranged along a first direction and a second direction crossing the first direction on the substrate. A first gap between adjacent light sources of the first to k-th light sources in the first direction may be from about 90 percent (%) to about 110% of a second gap between adjacent light sources of the first to k-th light sources in the second direction.

In an embodiment, the backlight unit may further include a voltage supply line disposed on the substrate and connected to the k-th light sources of the plurality of light source assemblies.

In an embodiment, the controller may include a plurality of sensing pads respectively connected to the plurality of sensing lines and a voltage supply pad connected to the voltage supply line.

In an embodiment, the plurality of sensing lines may respectively receive output voltages detected from the plurality of light source assemblies. The voltage supply line may supply a driving voltage to the plurality of light source assemblies.

In an embodiment, the controller may control the driving voltage based on the output voltages.

In an embodiment, the backlight unit may further include an insulation layer disposed on the plurality of sensing lines and the voltage supply line. The first to k-th light sources may be disposed on the insulation layer.

In an embodiment, the backlight unit may further include a reflection layer disposed on the insulation layer and not overlapping the first to k-th light sources.

In an embodiment, the backlight unit may further include a plurality of optical lenses disposed on the insulation layer and respectively covering the first to k-th light sources.

In an embodiment, each of the first to k-th light sources may include a mini light emitting diode ("LED") having a size of about 100 micrometers ($\mu m$) to about 200 $\mu m$ or a micro LED having a size of about 5 $\mu m$ to about 100 $\mu m$.

A display device in an embodiment includes a display panel and a backlight unit providing a light to the display panel. The backlight unit includes a substrate, a plurality of light source assemblies disposed on the substrate, each of the plurality of light source assemblies including first to k-th light sources, where the k is a natural number greater than or equal to two, a plurality of sensing lines disposed on the substrate, the plurality of sensing lines respectively connected to the first light sources of the plurality of light source assemblies, a connection line disposed on the substrate, the connection line connecting the first to k-th light sources of each of the plurality of light source assemblies in series, and a controller connected to the plurality of sensing lines. A width of the connection line is greater than a width of each of the plurality of sensing lines.

In an embodiment, the backlight unit may be disposed on the display panel and overlaps the display panel.

In an embodiment, the display panel may include a first display substrate, a second display substrate disposed on the first display substrate, and a liquid crystal layer disposed between the first display substrate and the second display substrate.

In an embodiment, the display device may further include an optical sheet disposed between the display panel and the backlight unit.

In an embodiment, the optical sheet may include a diffusion layer, a prism layer disposed on the diffusion layer, and a protective layer disposed on the prism layer.

In the backlight unit and the display device in the embodiments, the number or the first to k-th light sources may increase without increasing the number or the pads, so that a display area of the display device may increase. Further, the width of the connection line connecting the first to k-th light sources in series may be greater than the width of the sensing line connected to the first light source, so that the first to k-th light sources may emit light having uniform brightness, and display quality of the display device may be improved.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
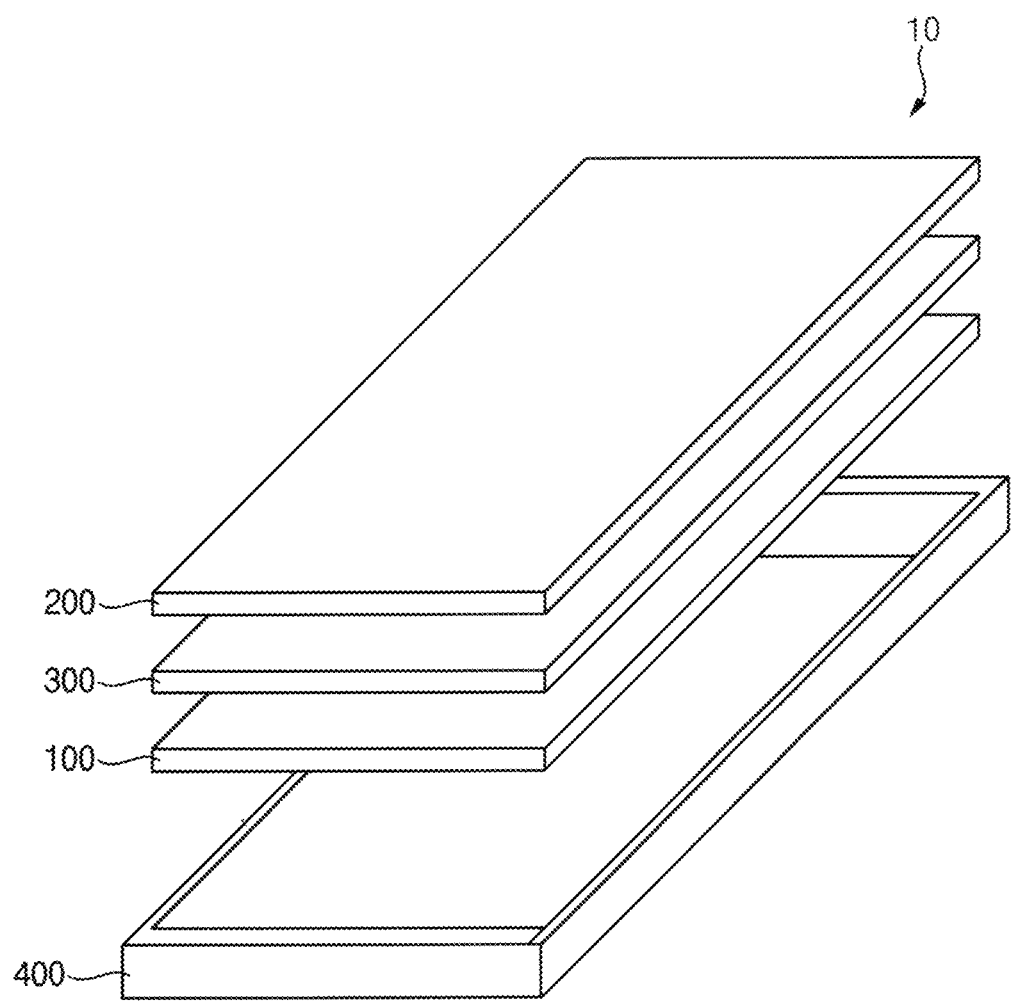
FIG. 1 is a perspective view schematically illustrating an embodiment of a display device.

Hereinafter, backlight units and display devices in embodiments will be explained in detail with reference to the accompanying drawings.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein. Terms such as "unit" may refer to a circuit or processor, for example.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Figure 2:
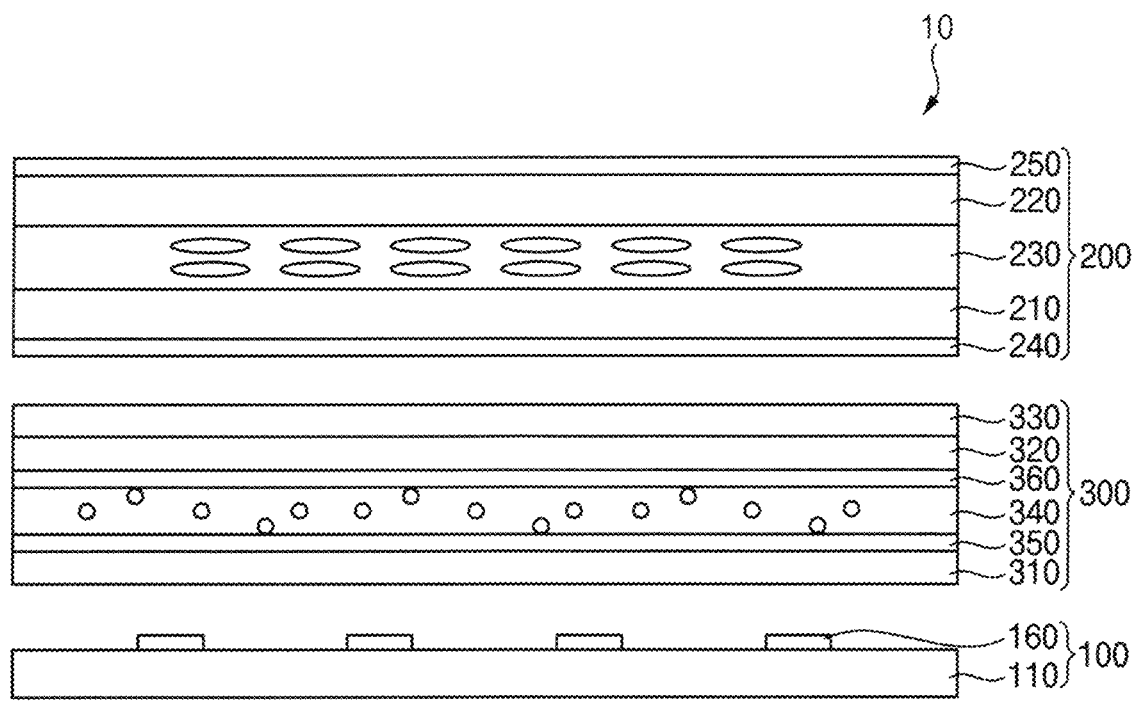
FIG. 2 is a cross-sectional view illustrating an embodiment of the display device in FIG. 1.

FIG. 1 is a perspective view schematically illustrating an embodiment of a display device 10. FIG. 2 is a cross-sectional view illustrating an embodiment of the display device 10 in FIG. 1.

Referring to FIGS. 1 and 2, the display device 10 may include a backlight unit 100, a display panel 200, an optical sheet 300, and a frame 400. The backlight unit 100, the display panel 200, and the optical sheet 300 may be accommodated in the frame 400.

The backlight unit 100 may include a substrate 110 and a plurality of light sources 160 disposed on the substrate 110. The backlight unit 100 may provide light emitted from each of the light sources 160 to the display panel 200.

The backlight unit 100 may be disposed under the display panel 200. The backlight unit 100 may overlap the display panel 200. In this case, the backlight unit 100 may be a direct type backlight unit for providing light to the display panel 200 under the display panel 200.

Detailed descriptions on the backlight unit 100 will be described below, and hereinafter, the display panel 200 and the optical sheet 300 will be described in detail.

The display panel 200 may be a light transmitting display panel. The light transmitting display panel is a display panel in which pixels of the display panel 200 may control transmittance of light provided from the backlight unit 100 to display an image.

In an embodiment, the display panel 200 may be a liquid crystal display panel. The display panel 200 may include a first display substrate 210, a second display substrate 220, and a liquid crystal layer 230. The second display substrate 220 may be disposed on the first display substrate 210, and the liquid crystal layer 230 may be disposed between the first display substrate 210 and the second display substrate 220.

The first display substrate 210 may include a transistor, a capacitor, and a pixel electrode connected to the transistor and the capacitor. The second display substrate 220 may include a common electrode opposite to the pixel electrode and a color filter. The liquid crystal layer 230 may include liquid crystal molecules.

The display panel 200 may display grayscales based on the liquid crystal molecules rearranged according to an electric field generated between the pixel electrode and the common electrode. In an embodiment, the liquid crystal molecules may be driven as an in-plane switching ("IPS") mode, a plane to line switching ("PLS") mode, a fringe field switching ("FSS") mode, etc., by the electric field.

The display panel 200 may further include a polarizing layer disposed under the first display substrate 210 and/or on the second display substrate 220. In an embodiment, the display panel 200 may include a first polarizing layer 240 disposed under the first display substrate 210 and a second polarizing layer 250 disposed on the second display substrate 220. However, the invention is not limited thereto, and in another embodiment, the display panel 200 may include any one of the first polarizing layer 240 and the second polarizing layer 250.

In an embodiment, each of the first polarizing layer 240 and the second polarizing layer 250 may be provided as a polarizing film. In an embodiment, a polarizing axis of the first polarizing layer 240 and a polarizing axis of the second polarizing layer 250 may be perpendicular to each other.

The optical sheet 300 may be disposed between the backlight unit 100 and the display panel 200. The optical sheet 300 may include a diffusion layer 310, a prism layer 320, and a protective layer 330.

The diffusion layer 310 may diffuse light provided from the backlight unit 100 to a surface light source emitting light having brightness more uniform than that of the light provided from the backlight unit 100. In an embodiment, the diffusion layer 310 may include an optically transparent resin such as polyethylene terephthalate ("PET"), polypropylene ("PP"), polycarbonate ("PC"), polymethyl methacrylate ("PMMA"), or the like. Also, in an embodiment, the diffusion layer 310 may include a plurality of scattering particles therein. In an embodiment, the scattering particles may include acrylic resin, styrene resin, or the like, for example.

The prism layer 320 may be disposed on the diffusion layer 310. The prism layer 320 may adjust an advancing direction of light equally diffused by the diffusion layer 310 and condense the light, thereby increasing the luminance of the light.

In an embodiment, the prism layer 320 may include a plurality of prisms extending in different directions. In an embodiment, the prism layer 320 may include an optically transparent resin such as PET, PP, PC, PMMA, or the like.

The protective layer 330 may be disposed on the prism layer 320. The protective layer 330 may protect the optical sheet 300 from external impact or foreign substances.

In an embodiment, the optical sheet 300 may further include a light conversion layer 340. The light conversion layer 340 may be disposed between the diffusion layer 310 and the prism layer 320. The light conversion layer 340 may include a plurality of quantum dots for converting the wavelength of light. The quantum dots change the wavelength of light, and combine light having different wavelengths and then emit the combined light.

The light conversion layer 340 may include the quantum dots having various sizes. The quantum dots may generate light having a short wavelength when the size of the quantum dot decreases, and may generate light having a long wavelength when the size of the quantum dot increases. Accordingly, the light conversion layer 340 may emit light having various wavelengths.

In an embodiment, the light emitted from the light conversion layer 340 may be white light, for example. In an embodiment, the light emitted from the backlight unit 100 may be blue light, for example. The blue light may be converted into the white light by the quantum dots of the light conversion layer 340.

In an embodiment, the optical sheet 300 may further include a first barrier layer 350. The first barrier layer 350 may be disposed between the diffusion layer 310 and the light conversion layer 340.

The first barrier layer 350 may block the introduction of gas such as oxygen and moisture into the light conversion layer 340. The first barrier layer 350 may include polymer, an oxide, and/or a dielectric material. In an embodiment, the first barrier layer 350 may include a polymer such as PET and/or an oxide such as silicon oxide, titanium oxide, and/or aluminum oxide, for example.

In an embodiment, the optical sheet 300 may further include a second barrier layer 360. The second barrier layer 360 may be disposed between the light conversion layer 340 and the prism layer 320.

The second barrier layer 360 may block the introduction of gas such as oxygen and moisture into the light conversion layer 340. In an embodiment, the second barrier layer 360 may include substantially the same material as that of the first barrier layer 350.

Figure 3:
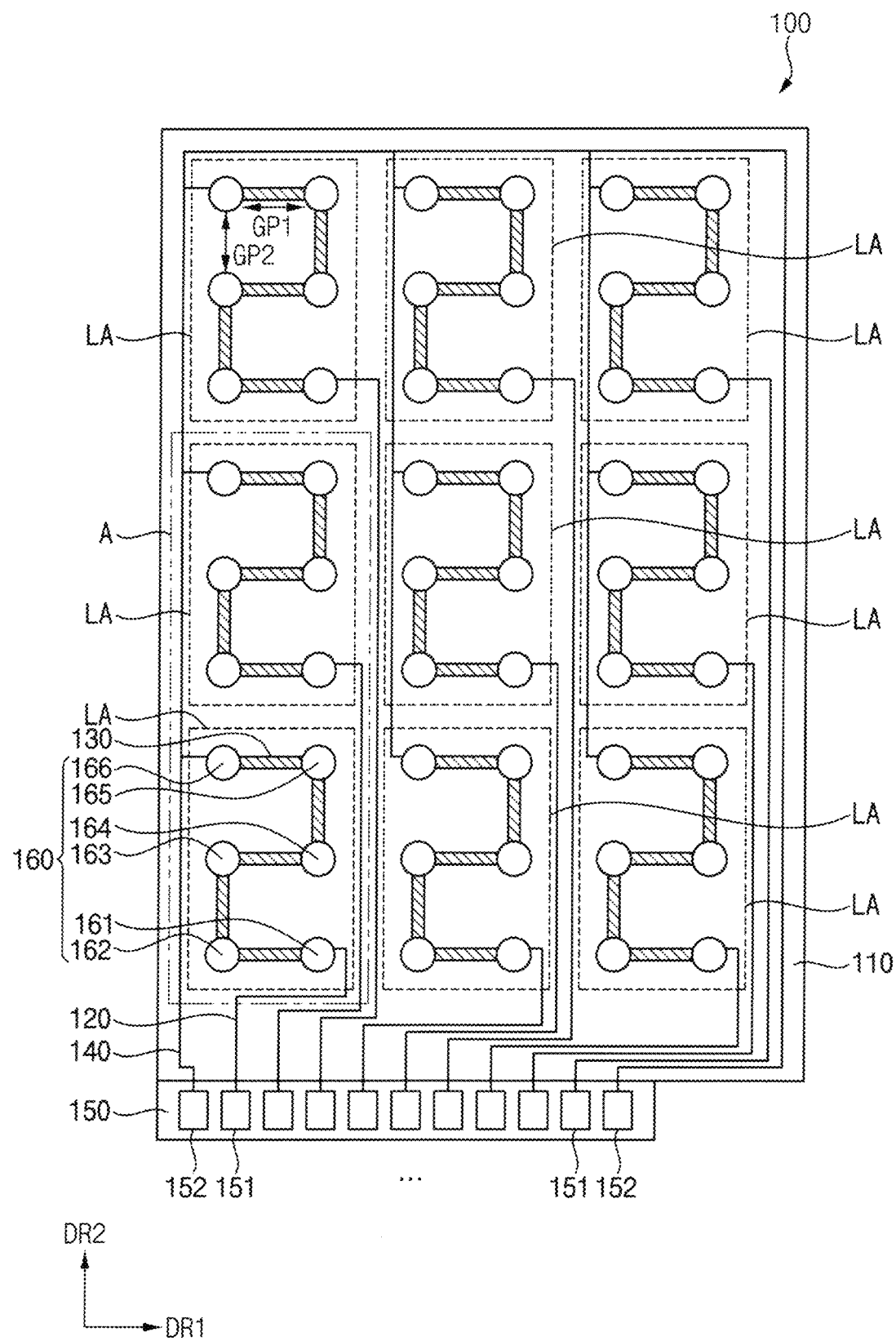
FIG. 3 is a plan view illustrating an embodiment of a backlight unit.

FIG. 3 is a plan view illustrating an embodiment of the backlight unit 100.

Referring to FIG. 3, the backlight unit 100 may include the substrate 110, a plurality of light source assemblies LA, a plurality of sensing lines 120, a plurality of connection lines 130, a voltage supply line 140, and a controller 150.

In an embodiment, the substrate 110 may be a glass substrate, for example. In another embodiment, the substrate 110 may be a printed circuit board ("PCB"), a flexible PCB, or the like, for example.

The light source assemblies LA may be disposed on the substrate 110. The light source assemblies LA may be arranged on the substrate 110 along a first direction DR1 and a second direction DR2 crossing the first direction DR1.

In an embodiment, the backlight unit 100 may include nine light source assemblies LA as illustrated in FIG. 3. However, the invention is not limited thereto, and in another embodiment, the backlight unit 100 may include two to eight or ten or more light source assemblies LA.

Each of the light source assemblies LA may include first to k-th light sources 160, where k is a natural number greater than or equal to two. In an embodiment, the number of the light sources 160 included in each of the light source assemblies LA may be equal.

In an embodiment, each of the light source assemblies LA may include six light sources 160 as illustrated in FIG. 3. However, the invention is not limited thereto, and in another embodiment, each of the light source assemblies LA may include two to five or seven or more light sources 160.

In an embodiment, each of the light sources 160 may include a mini light emitting diode ("LED") having a size of about 100 micrometers (μm) to about 200 μm or a micro LED having a size of about 5 μm to about 100 μm, for example.

The light sources 160 may be arranged along the first direction DR1 and the second direction DR2 on the substrate 110. In an embodiment, a first gap GP1 between the adjacent light sources 160 in the first direction DR1 may be substantially uniform. Further, a second gap GP2 between the adjacent light sources 160 in the second direction DR2 may be substantially uniform.

In an embodiment, the first gap GP1 between the adjacent light sources 160 may be from about 90 percent (%) to about 110% of the second gap GP2 between the adjacent light sources 160. In such an embodiment, the light sources 160 may be relatively uniformly arranged on the substrate 110, therefore, the backlight unit 100 may emit light uniformly.

The sensing lines 120 may be disposed on the substrate 110. The sensing lines 120 may be respectively connected to the light source assemblies LA. The sensing lines 120 may respectively receive output voltages detected from the light source assemblies LA. In an embodiment, when the backlight unit 100 includes nine light source assemblies LA, the backlight unit 100 may include nine sensing lines 120.

The sensing lines 120 may be connected to the first light sources 161 of the light source assemblies LA, respectively. Each of the sensing lines 120 may be connected to the first light source 161 among the first to k-th light sources 160, and may not be connected to other light sources. Each of the sensing lines 120 may receive an output voltage detected from the first light source 161 of each of the light source assemblies LA. In an embodiment, when each of the light source assemblies LA includes six light sources 160, each of the sensing lines 120 may be connected to the first light source 161 and may not be connected to the second to sixth light sources 162, 163, 164, 165, and 166.

The connection lines 130 may be disposed on the substrate 110. Each of the connection lines 130 may connect the first to k-th light sources 160 of each of the light source assemblies LA. In an embodiment, when the backlight unit 100 includes nine light source assemblies LA, the backlight unit 100 may include nine connection lines 130, for example.

Each of the connection lines 130 may connect the first to k-th light sources 160 of each of the light source assemblies LA in series. In an embodiment, when each of the light source assemblies LA includes six light sources 160, each of the connection lines 130 may connect the first to k-th light sources 160 of each of the light source assemblies LA in order in series.

Each of the connection lines 130 may have a relatively large width. In an embodiment, a width of each of the connection lines 130 may be greater than a width of each of the sensing lines 120. Each of the connection lines 130 may connect the first to k-th light sources 160 of each of the light source assemblies LA in series, therefore, a difference in resistance between the first to k-th light sources 160 connected by each of the connection lines 130 may increase when the width of each of the connection lines 130 is relatively small. In the illustrated embodiment, the width of each of the connection lines 130 may be greater than the width of each of the sensing lines 120, therefore, a difference in resistance between the first to k-th light sources 160 may decrease.

FIG. 3 illustrates that each of the connection lines 130 has a "⊐" shape, however, the invention is not limited thereto, and each of the connection lines 130 may have any shape to connect the first to k-th light sources 160 in series.

The voltage supply line 140 may be disposed on the substrate 110. The voltage supply line 140 may be connected to the light source assemblies LA. The voltage supply line 140 may supply a driving voltage to the light source assemblies LA. In an embodiment, when the backlight unit 100 includes nine light source assemblies LA, the backlight unit 100 may include one voltage supply line 140 connected to the nine light source assemblies LA.

The voltage supply line 140 may be connected to the k-th light sources of the light source assemblies LA. The voltage supply line 140 may be connected to the k-th light source among the first to k-th light sources 160, and may not be connected to other light sources. The voltage supply line 140 may supply the driving voltage to the k-th light source of each of the light source assemblies LA. The driving voltage may be supplied to the first to k-th light sources 160 of each of the light source assemblies LA through the connection lines 130. In an embodiment, when each of the light source assemblies LA includes six light sources 160, the voltage supply line 140 may be connected to the sixth light source 166 and may not be connected to the first to fifth light sources 161, 162, 163, 164, and 165, for example.

The controller 150 may be disposed on a side of the substrate 110. The controller 150 may be connected to the sensing lines 120 and the voltage supply line 140. The controller 150 may include a plurality of sensing pads 151 respectively connected to the sensing lines 120 and a voltage supply pad 152 connected to the voltage supply line 140. In an embodiment, when the backlight unit 100 includes nine sensing lines 120 and one voltage supply line 140, the controller 150 may include nine sensing pads 151 and two voltage supply pads 152. In an embodiment, an end of the voltage supply line 140 may be connected to one voltage supply pad 152, and another end of the voltage supply line 140 may be connected to another voltage supply pad 152, for example.

The controller 150 may control the driving voltage provided to the voltage supply line 140 based on the output voltages transmitted from the sensing lines 120. The output voltages detected from the light source assemblies LA may be supplied to the controller 150 through the sensing lines 120, respectively, and the controller 150 may control the driving voltage provided to the voltage supply line 140 based on the output voltages.

In an embodiment, the controller 150 may include a switching transistor. The controller 150 may control an on-duty of the switching transistor to control the amount of current flowing through the voltage supply line 140. Here, the term "on-duty" may mean a time duration in which the switching transistor is turned on.

The controller 150 may decrease the on-duty of the switching transistor when the output voltages detected from the light source assemblies LA are lower than a reference voltage. In this case, the amount of current flowing the voltage supply line 140 may increase, thereby increasing the driving voltage supplied to the light source assemblies LA. When the driving voltage supplied to the light source assemblies LA increases, the output voltages outputted from the light source assemblies LA may increase.

The controller 150 may increase the on-duty of the switching transistor when the output voltages are higher than a reference voltage. In this case, the amount of current flowing the voltage supply line 140 may decrease, thereby decreasing the driving voltage supplied to the light source assemblies LA.

Based on the above-described scheme, the controller 150 may control the amount of current applied to the light source assemblies LA to be constant. In other words, the controller 150 may control the driving voltage to supply a constant current to each of the light source assemblies LA.

In a backlight unit according to prior art, the light sources may be connected to the sensing lines, respectively, so that the number of the light sources may be equal to the number of the sensing pads. When the backlight unit includes 54 light sources, for example, the controller may include 54 sensing pads, for example. In this case, the number of the sensing pads may increase as the number of light sources increase. However, since there is a limit to the area of the controller in which the sensing pads are disposed, there may be a limit to an increase in the number of the sensing pads.

In the backlight unit 100 in embodiments of the invention, each of the light source assemblies LA may include the plurality of light sources 160, and the light source assemblies LA may be connected to the sensing lines 120, respectively, so that the number of the light source assemblies LA may be equal to the number of the sensing pads 151. In an embodiment, when each the light source assemblies LA includes six light sources 160 and the backlight unit 100 includes 54 light sources 160 as illustrated in FIG. 3, the controller 150 may include nine sensing pads 151, for example. Accordingly, the number of the sensing pads 151 may not increase although the number of the light sources 160 increases, and the backlight unit 100 may include a relatively large number of light sources 160 without limitation of the area of the controller 150. Therefore, brightness of light provided from the backlight unit 100 may increase.

Figure 4:
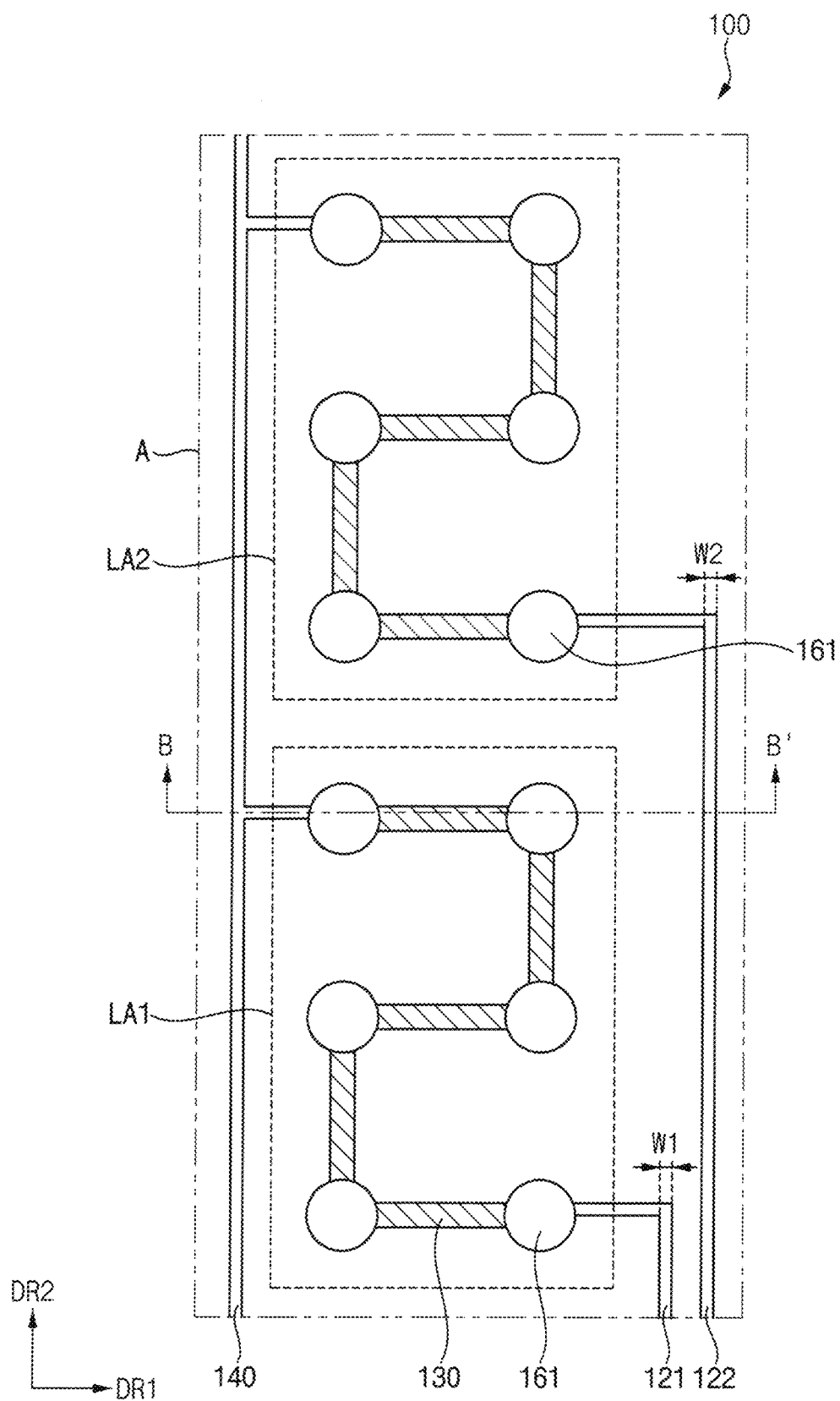
FIG. 4 is a plan view illustrating an embodiment of an area A in FIG. 3.

FIG. 4 is a plan view illustrating an embodiment of an area A in FIG. 3.

Referring to FIGS. 3 and 4, in an embodiment, the widths of the sensing lines 120 may be substantially equal to each other.

The light source assemblies LA may include a first light source assembly LA1 disposed in a first distance from the controller 150 and a second light source assembly LA2 disposed in a second distance greater than the first distance from the controller 150, and the sensing lines 120 may include a first sensing line 121 connected to the first light source 161 of the first light source assembly LA1 and a second sensing line 122 connected to the first light source 161 of the second light source assembly LA2. In this case, because the second light source assembly LA2 is disposed farther from the controller 150 than the first light source assembly LA1 is from the controller 150, a length of the second sensing line 122 may be greater than a length of the first sensing line 121.

In an embodiment, a width W2 of the second sensing line 122 may be substantially equal to a width W1 of the first sensing lines 121. A width of the sensing line 120 may mean a length of the sensing line 120 in a direction crossing a main extending direction of the sensing line 120. In an embodiment, when the sensing line 120 mainly extends in the second direction DR2, the width of the sensing line 120 may mean a length of the sensing line 120 in the first direction DR1, for example.

FIGS. 3 and 4 illustrate that the first light source assembly LA1 is disposed in a third row and a first column in the light source assemblies LA and the second light source assembly LA2 is disposed in a second row and a first column in the light source assemblies LA, however, the invention is not limited thereto. The first light source assembly LA1 and the second light source assembly LA2 may be applied to any light source assemblies LA where the second light source assembly LA2 is disposed farther from the controller 150 than the first light source assembly LA1 is from the controller 150.

Figure 5:
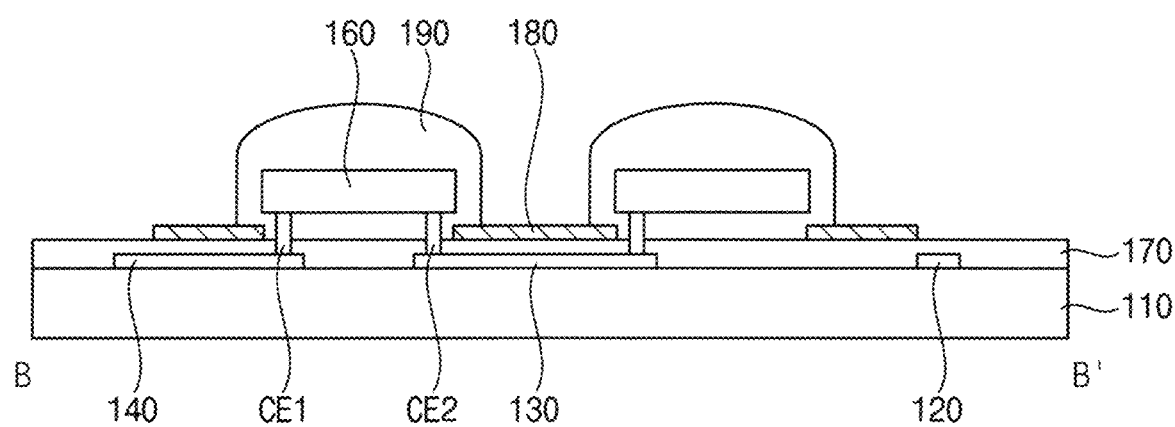
FIG. 5 is a cross-sectional view taken along line B-B' in FIG. 4.

FIG. 5 is a cross-sectional view taken along line B-B' in FIG. 4.

Referring to FIGS. 3, 4, and 5, the backlight unit 100 may further include an insulation layer 170, a reflective layer 180, and a plurality of optical lenses 190.

The insulation layer 170 may be disposed on the sensing lines 120, the connection lines 130, and the voltage supply line 140. The insulation layer 170 may cover the sensing lines 120, the connection lines 130, and the voltage supply line 140 not to be exposed outside.

The insulation layer 170 may include an inorganic insulation material and/or an organic insulation material. In an embodiment, the inorganic insulation material may include at least one of metal oxides such as silicon oxide, silicon nitride, silicon oxynitride, aluminum oxide, or the like, for example. In an embodiment, the organic insulation material may include at least one of acrylates resin, epoxy resin, phenolic resin, polyamides resin, polyimides resin, unsaturated polyesters resin, poly-phenylene ethers resin, poly-phenylene sulfides resin, and benzocyclobutene resin, for example.

The light sources 160 may be disposed on the insulation layer 170. Each of the light sources 160 may include a first connection electrode CE1 and a second connection electrode CE2 passing through the insulation layer 170, and each of the light sources 160 may be electrically connected to the sensing lines 120, the connection lines 130, and the voltage supply line 140 through the first and second connection electrodes CE1 and CE2.

The reflective layer 180 may be disposed on the insulation layer 170. The reflective layer 180 may not overlap the light sources 160. The reflective layer 180 may reflect light emitted from each of the light sources 160 and light reflected by another structure, and may allow the lights to finally advance toward the display panel 200 in FIG. 2, thereby improving light efficiency.

In an embodiment, the reflective layer 180 may have a multilayer structure. In an embodiment, the reflective layer 180 may include a general reflective layer (such as a white reflective film) and/or a high reflectance reflective layer (such as a silver reflective film), for example.

The optical lenses 190 may be disposed on the insulation layer 170, and may respectively cover the light sources 160. Each of the optical lenses 190 may be installed such that light emitted from each of the light sources 160 that is a point light source is not concentrated above the light emitting surface of each of the light sources 160 but may be uniformly dispersed through the entire display panel 200. The optical lenses 190 applied to ensure the luminance uniformity of the entire display panel 200 may be installed to respectively cover the light sources 160, and to refract and scatter light emitted from each of the light sources 160.

In an embodiment, the optical lens 190 may include a transparent material such as PC, PMMA, silicon, or the like.

Figure 6:
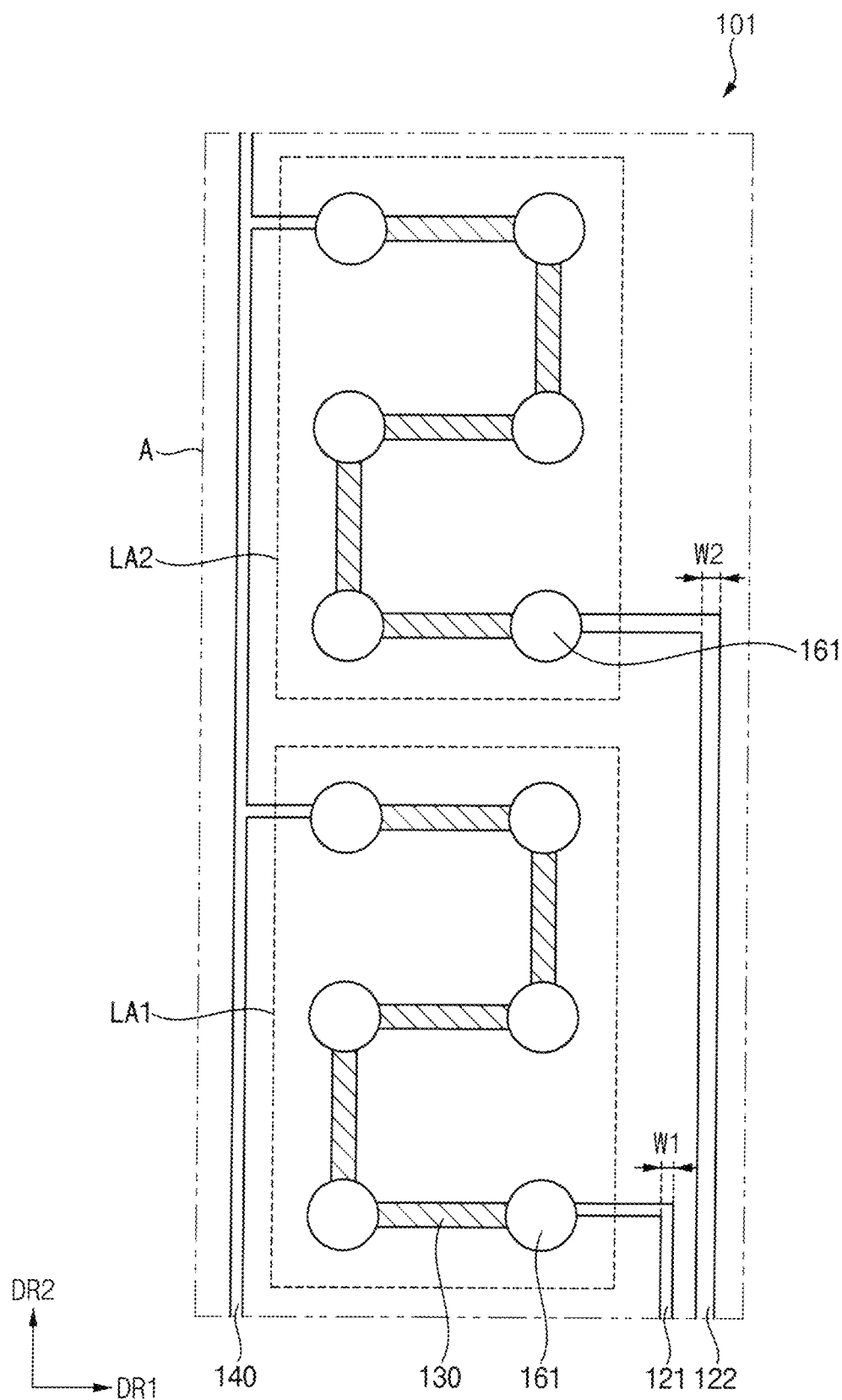
FIG. 6 is a plan view illustrating another embodiment of an area A in FIG. 3.

FIG. 6 is a plan view illustrating another embodiment of an area A in FIG. 3.

Referring to FIGS. 3 and 6, in an embodiment, the widths of the sensing lines 120 may be different from each other.

In an embodiment of a backlight unit 101, a width W2 of the second sensing line 122 connected to the first light source 161 of the second light source assembly LA2 may be greater than a width W1 of the first sensing lines 121 connected to the first light source 161 of the first light source assembly LA1. The length of the second sensing line 122 may be greater than the length of the first sensing line 121 as described above, and when the width of the first sensing line 121 is substantially equal to the width of the second sensing line 122, a resistance of the second sensing line 122 may be greater than a resistance of the first sensing line 121. In this case, a voltage drop of an output voltage transmitted by the second sensing line 122 may be greater than a voltage drop of an output voltage transmitted by the first sensing line 121.

However, in the illustrated embodiment, the width W2 of the second sensing line 122 may be greater than the width W1 of the first sensing lines 121, therefore, the resistance of the second sensing line 122 may be substantially equal to the resistance of the first sensing line 121. Accordingly, a voltage drop of an output voltage transmitted by the second sensing line 122 may be substantially equal to a voltage drop of an output voltage transmitted by the first sensing line 121.

The backlight unit and the display device in the embodiments may be applied to a display device included in a computer, a notebook, a mobile phone, a smartphone, a smart pad, a portable media player ("PMP"), a personal digital assistance ("PDA"), an MP3 player, or the like.

Although the backlight units and the display devices in the embodiments have been described with reference to the drawings, the illustrated embodiments are examples, and may be modified and changed by a person having ordinary knowledge in the relevant technical field without departing from the technical spirit described in the following claims.

What is claimed is:

1. A backlight unit, comprising:
a substrate;
a plurality of light source assemblies disposed on the substrate, each of the plurality of light source assemblies including first to k-th light sources, where the k is a natural number greater than or equal to two;
a plurality of sensing lines disposed on the substrate, the plurality of sensing lines respectively connected to the first light sources of the plurality of light source assemblies;
a connection line disposed on the substrate, the connection line connecting the first to k-th light sources of each of the plurality of light source assemblies in series; and
a controller connected to the plurality of sensing lines,
wherein a width of the connection line is greater than a width of each of the plurality of sensing lines.

2. The backlight unit of claim 1, wherein widths of the plurality of sensing lines are equal to each other.

3. The backlight unit of claim 1, wherein widths of the plurality of sensing lines are different from each other.

4. The backlight unit of claim 3, wherein the plurality of light source assemblies includes a first light source assembly disposed on a first distance from the controller and a second light source assembly disposed on a second distance greater than the first distance from the controller,
wherein the plurality of sensing lines includes a first sensing line connected to the first light source assembly and a second sensing line connected to the second light source assembly, and
wherein a width of the second sensing line is greater than a width of the first sensing line.

5. The backlight unit of claim 1, wherein a number of the light sources included in each of the plurality of light source assemblies is equal.

6. The backlight unit of claim 1, wherein the first to k-th light sources are arranged along a first direction and a second direction crossing the first direction on the substrate, and
wherein a first gap between adjacent light sources of the first to k-th light sources in the first direction is from about 90 percent to about 110 percent of a second gap between adjacent light sources of the first to k-th light sources in the second direction.

7. The backlight unit of claim 1, further comprising:
a voltage supply line disposed on the substrate and connected to the k-th light sources of the plurality of light source assemblies.

8. The backlight unit of claim 7, wherein the controller includes a plurality of sensing pads respectively connected to the plurality of sensing lines and a voltage supply pad connected to the voltage supply line.

9. The backlight unit of claim 7, wherein the plurality of sensing lines respectively receives output voltages detected from the plurality of light source assemblies, and
wherein the voltage supply line supplies a driving voltage to the plurality of light source assemblies.

10. The backlight unit of claim 9, wherein the controller controls the driving voltage based on the output voltages.

11. The backlight unit of claim 7, further comprising an insulation layer disposed on the plurality of sensing lines and the voltage supply line,
wherein the first to k-th light sources are disposed on the insulation layer.

12. The backlight unit of claim 11, further comprising:
a reflection layer disposed on the insulation layer and not overlapping the first to k-th light sources.

13. The backlight unit of claim 11, further comprising:
a plurality of optical lenses disposed on the insulation layer and respectively covering the first to k-th light sources.

14. The backlight unit of claim 1, wherein each of the first to k-th light sources includes a mini light emitting diode having a size of about 100 micrometers to about 200 micrometers or a micro light emitting diode having a size of about 5 micrometers to about 100 micrometers.

15. A display device, comprising:
a display panel; and a backlight unit providing a light to the display panel, wherein the backlight unit includes:

a substrate;

a plurality of light source assemblies disposed on the substrate, each of the plurality of light source assemblies including first to k-th light sources, where the k is a natural number greater than or equal to two;

a plurality of sensing lines disposed on the substrate, the plurality of sensing lines respectively connected to the first light sources of the plurality of light source assemblies;

a connection line disposed on the substrate, the connection line connecting the first to k-th light sources of each of the plurality of light source assemblies in series; and a controller connected to the plurality of sensing lines, and wherein a width of the connection line is greater than a width of each of the plurality of sensing lines.

16. The display device of claim 15, wherein the backlight unit is disposed on the display panel and overlaps the display panel.

17. The display device of claim 15, wherein the display panel includes:

a first display substrate;

a second display substrate disposed on the first display substrate; and a liquid crystal layer disposed between the first display substrate and the second display substrate.

18. The display device of claim 15, further comprising:

an optical sheet disposed between the display panel and the backlight unit.

19. The display device of claim 18, wherein the optical sheet includes:

a diffusion layer;

a prism layer disposed on the diffusion layer; and a protective layer disposed on the prism layer.

* * * * *